March 12, 1968 W. W. PORTER 3,372,806
HARVEST SHAKER
Filed April 27, 1966 4 Sheets-Sheet 3

INVENTOR.
WELLINGTON W. PORTER
BY
ATTORNEY

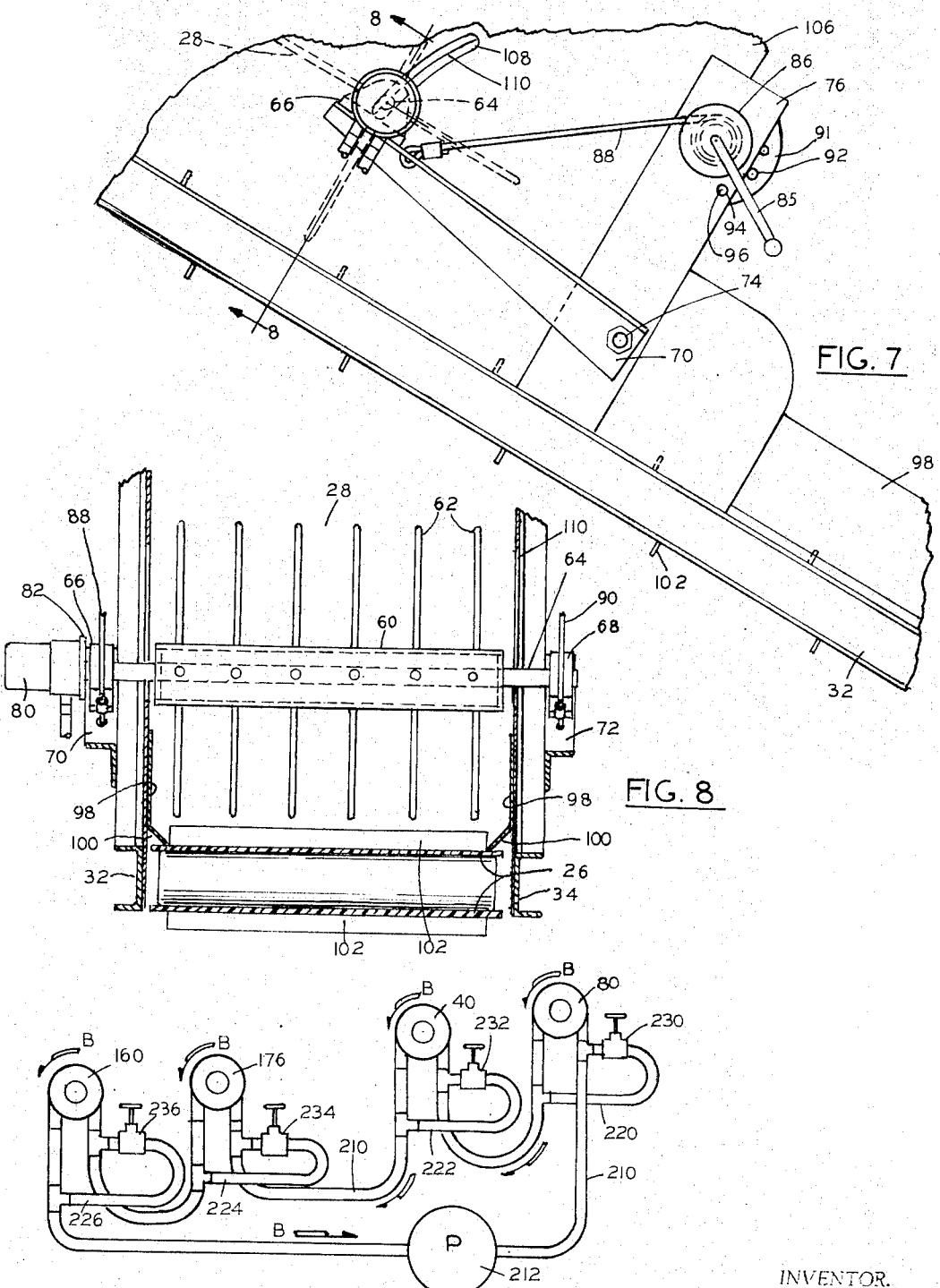

United States Patent Office 3,372,806
Patented Mar. 12, 1968

3,372,806
HARVEST SHAKER
Wellington W. Porter, R.D. 2, Waterloo, N.Y. 13165
Filed Apr. 27, 1966, Ser. No. 545,623
11 Claims. (Cl. 209—247)

ABSTRACT OF THE DISCLOSURE

Harvest apparatus comprising an elevating conveyor having a counter rotating drum with tines disposed thereabove to limit the thickness of harvest conveyed, and a shaker apparatus comprising an endless conveyor of course mesh, providing a flexible bed grid disposed to receive harvest from the elevating conveyor, the shaker apparatus including means to advance the bed grid in a direction away from the elevating conveyor, at a selected speed, and shaker rolls disposed beneath the bed mounted eccentrically on axes uniformly spaced and lying in a common plane beneath the bed grid, each roll having a shaker cam rod affixed thereto on the most eccentric side, and means for driving all of the rolls in the same direction, and at a speed independent of the conveyor bed grid movement.

---

This invention relates to apparatus for mechanically separating fresh harvest such as spinach, turnip greens, collards, kale, potatoes and the like, from soil, sand, worms, small loose leaves and other foreign matter.

More particularly the invention is directed to conveyor like apparatus adapted to violently shake the harvest in an effective manner to separate the foreign matter, the apparatus having an elevator in association therewith provided with means to restrict the rate of feed of harvest to the separating bed to a desirable rate.

The apparatus comprises a coarse wire cloth mesh in the form of an endless belt, to provide a conveyor bed upon which the harvest is adroitly subjected to vertical accelerations or pulsations peculiarly adapted to separate the foreign material from the harvest. The endless belt, of a mesh in the order of an inch, is adapted to convey the harvest to a discharge point while being subjected to shaker activity imposed upon the belt by high rise rotatable cams, disposed at spaced intervals beneath the belt and along the conveyor bed.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIGURE 5 is a transverse section taken on the line 5—5 of FIGURE 3;

FIGURE 7 is an enlarged fragmentary side elevational view of the elevator distributor;

FIGURE 8 is a sectional view taken on the line 8—8 of FIGURE 7; and

FIGURE 9 is a plan view of the hydraulic drive circuit.

Figure 1:
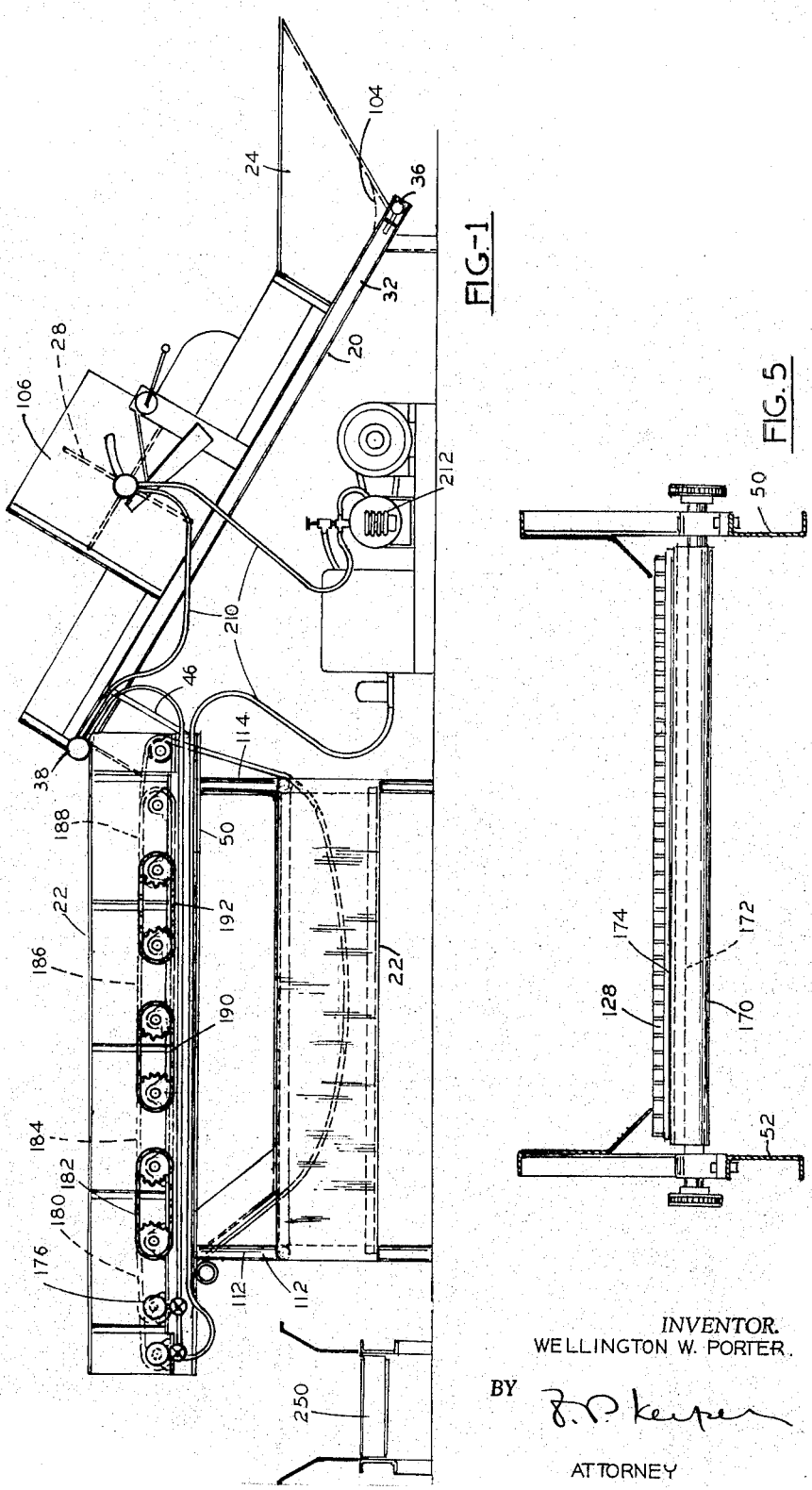
FIGURE 1 is a side elevation of the shaker and elevator.

Referring to the drawings, and more particularly to FIGURE 1, there is shown an elevator 20 and a shaker 22, the elevator having a hopper 24 at its lower end, a conveyor belt 26 (see FIGURE 8), a distributor 28 to control the thickness of and distribution of the greens or other produce or harvest carried by the elevator, so as to provide a substantially uniformly distributed discharge on the bed of the shaker 22. The elevator comprises spaced channel irons 32 and 34, and lower and upper rolls as at 36 and 38 for the conveyor belt 26. The upper roll is driven by a hydraulic motor 40 (FIGURE 2), supported on the end of the roller shaft 42 for roll 38, the motor having a torque arm 44. The upper end of the elevator is supported on struts 46 projecting angularly upward from a cross member 48 affixed to and extending between the channel side frame members 50 and 52 of the shaker 22.

Midway along the length of the elevator is a distributor 28 comprising a rotating drum 60 having radial tines 62 of uniform length, and uniformly spaced along the drum 60, there being four rows angularly spaced around the drum at 90 degree intervals. The axle of the drum 60 is journalled in bearings 66 and 68 mounted on swinging arms 70 and 72, pivoted as at 74 upon spaced channel members such as 76, each extending perpendicularly from the channel members 32 and 34. The drum 60 is rotated counter-clockwise, as shown in FIGURE 7, by the shaft 64, which in turn supports and derives its rotation from a hydraulic motor 80, having a torque arm 82. The height of the distributor 28 above the conveyor belt 26 of the elevator, may be adjusted to suit, by swinging the arms 70 and 72, as by the hand crank 85, having a cross shaft journalled in the members 76. The crank cross shaft is provided with flexible cable drums as at 86 at its opposite ends, and cables 88 and 90 extending to and attached to the respective arms 70 and 72. The crank shaft 85 is provided with a disk 91 disposed immediately behind upright 76, and having a plurality of apertures 92 disposed on a circle, any one of which may be brought into registry with an aperture 94 in the member 76, so as to receive a slidable pin 96, adapted to lock the crank shaft in any selected position, when the pin is also slid into an aperture 92.

The elevator is provided with side plates 98, having inclined lower lips or flanges 100 disposed over the elevator belt edges, the cleats 102 of the belt being somewhat shorter than the width of the belt to accommodate the side member lips 100. The hopper 24 is also provided with an inclined flexible apron 104, overlying the lower end of the elevator belt 26, so as to assure hopper discharge upon the upwardly travelling portion of the belt. Adjacent the distributor, side plates of greater height 106, are employed, to prevent spillage over the elevator side due to distributor action, and such side plates are provided with arcuate apertures 180, through which the distributor shaft 64 extends, to permit the height adjustment in relation to the elevator conveyor belt 26. Such slot may be closed by arcuately slitted flexible material such as stiff canvas as indicated at 110.

The shaker 22 comprises spaced side channels 50 and 52, supported upon posts such as 112 and 114. Mounted on the opposite ends of the channels, on sections 116 of reduced width, are bearings such as 118 and 120 in which are journalled shafts 122 and 124, such shafts being provided with spaced sprockets 126 adapted to mesh with the openings in the flexible endless shaker bed 128. In order to support the upper reach of the endless bed 128, and to apply suitable vertical shaker motion thereto, a series of cam rollers 130, 132, 134, 136, 138, 140, 142 and 144 are journalled in bearings 145 mounted on the channels 50 and 52, in spaced relation along the length thereof.

Figure 3:
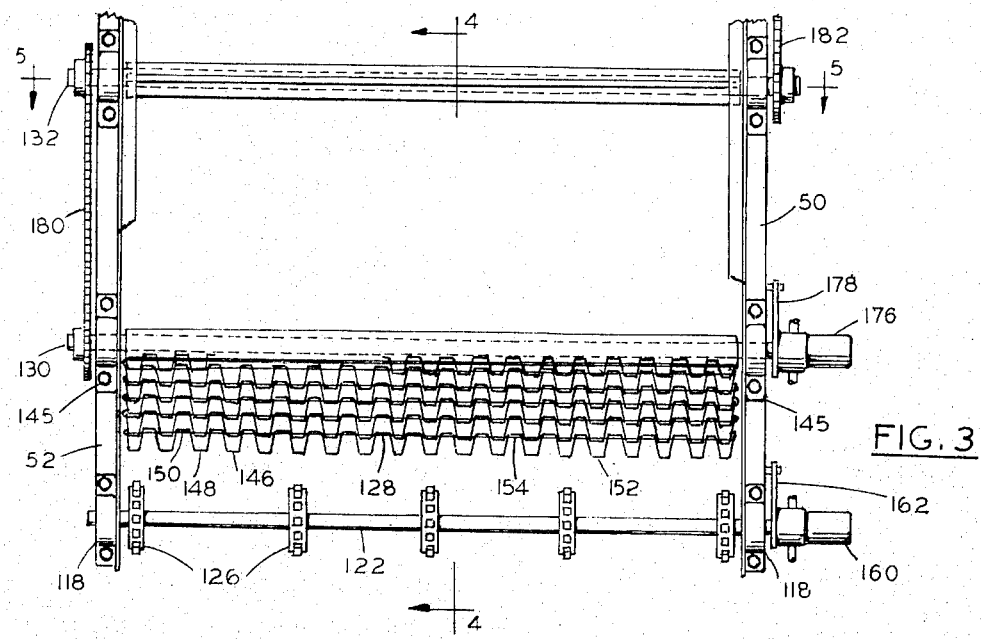
FIGURE 3 is a fragmentary further enlarged plan view of one end of the shaker bed, with parts broken away.
Figure 6:
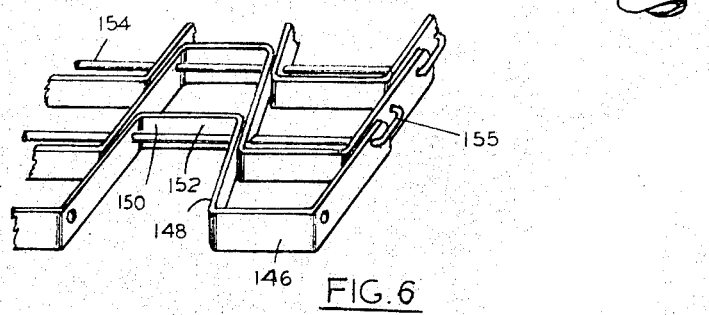
FIGURE 6 is an enlarged fragmentary perspective view of the flexible mat.

In practice, the mesh bed 128, see FIGURES 3 and 6, may comprise a series of edgewise strips 146 having reverse bends 148 and 150 spaced approximately one inch apart to form reverse U loops 152 of slightly greater depth than an inch, the U loops 152 of each transverse strip being slightly trapezoidal, and being pivotally attached to the adjacent strip through transverse wire pintles 154, the mesh bed providing thereby a flexible frame work defining a multiplicity of apertures of substantially square configuration of a pitch of about one inch lengthwise and cross-wise of the grid. The pintle ends 155 are U bent and keyed in apertures in the end loop.

As will be seen, the endless flexible grid 128 is supported at opposite ends of the bed by the shafts 122 and 124 and the spaced rolls 126 having sprocket like teeth 127 interfitting with the grid apertures. The sprocket shaft 122 is driven by a hydraulic motor 160 mounted on the shaft end, and having a torque arm 162.

Intermediate of the ends of the bed, the grid is supported upon the revolving eccentric high lift cam rollers, each of which comprises a thin wall tube 170 of an internal diameter of about two inches, eccentrically mounted with its inside wall tangentially affixed to drive shafts 172 of an external diameter of about 1¼" to provide an eccentricity of ¼ to ⅜ of an inch. The spacing between cam roller axes may be about 13½ inches and the spacing between the end cam rollers and shafts 122 and 124 is about 9½ inches. Upon the exterior of each of the tubes is welded or otherwise secured a one-half inch rod 174, the same being affixed to the external wall of the tube along an elemental line furthest from the axis of rotation of the drive shaft 172. The shaft of cam roller 130 is extended at one end, and supports and is driven by a hydraulic motor 176 having a torque arm 178. The shafts of cam rollers 130 and 132 are provided with a sprocket and chain drive 180, disposed on the opposite side of the shaker from the motor 176. Cam roller 134 and its shaft is driven by a sprocket and chain drive 182 from the shaft of cam roller 132 and is disposed on the same side of the shaker as the motor 176. In turn, the shaft of cam roller 136 is driven from the shaft of cam roller 134, and the shaft of cam roller 140 is driven from the shaft of cam roller 138, and the shaft of cam roller 144 is driven from the shaft of cam roller 142 by similar chain drives 184, 186 and 188 respectively disposed on the opposite side from the motor 176, while the shaft of cam roller 138 is driven from the shaft of cam roller 136, and the shaft of cam roller 142 is driven from the shaft of cam roller 140, by chain drives 190 and 192 respectively, similar to chain drive 182, and all disposed on the same side as motor 176.

Figure 2:
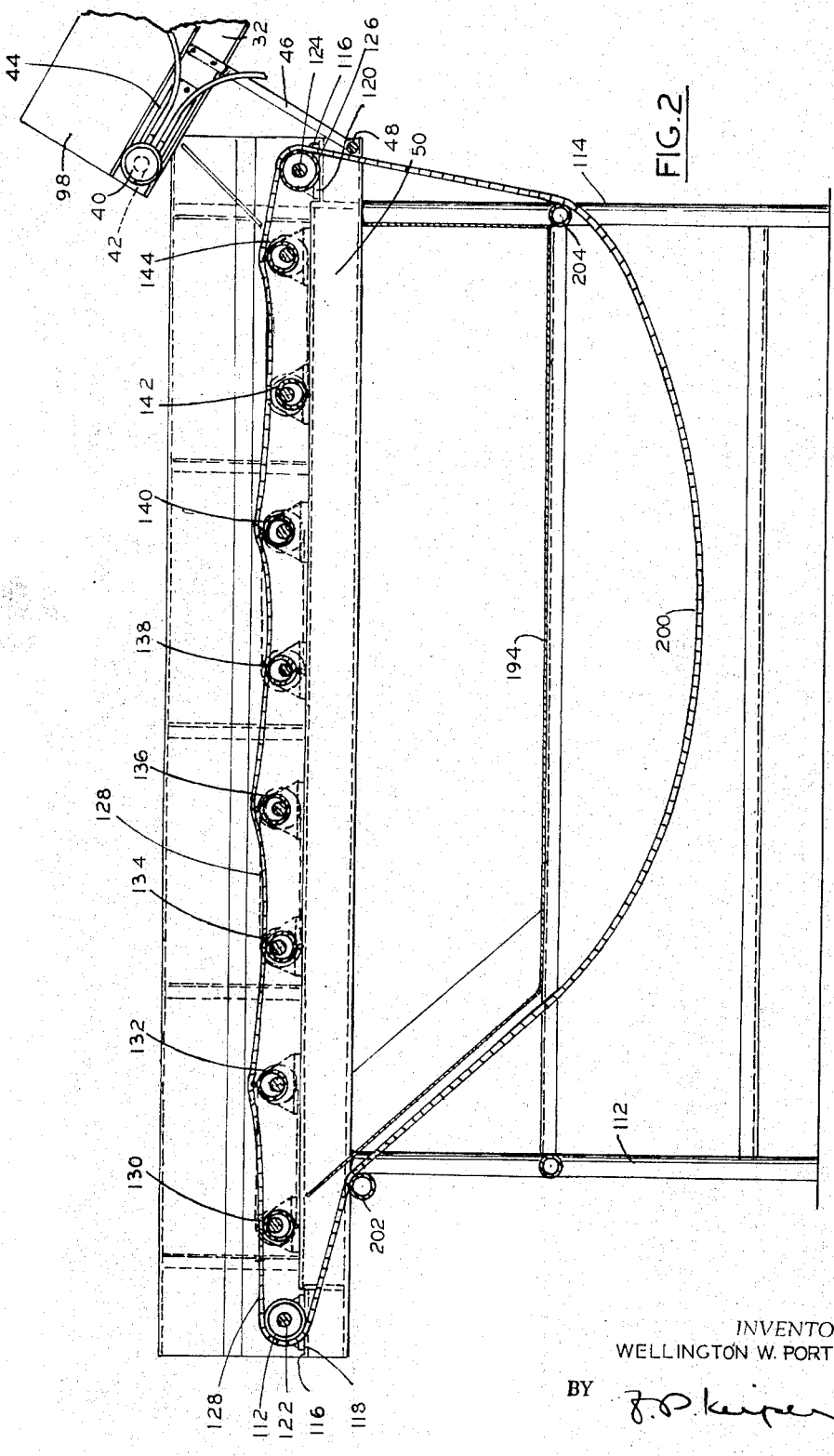
FIGURE 2 is an enlarged longitudinal section through the shaker portion of the invention.

All of the chain drives are such as to effect rotation of the cam shafts in the same direction and at the same identical speeds. The eccentricity of the tube 170, and the cam rod 174 affixed thereto of each cam shaft is preferably identical, but the phase relation of the cam rods 174 of cam rollers 130, 134, 138 and 142 is 180 degrees from the cam rods 174 of rollers 132, 136, 140 and 144. Thus when the cam rods 174 of the cam rollers 130, 134, 138 and 142 simultaneously reach their high points and support the endless mesh at high points, the cam rods of cam rollers 132, 136, 140 and 144, are at their low points. The portions of the tubes 170, where tangential to and affixed to their shafts 172 act to support the endless mesh 128 midway between the shafts 130 and 134, 134 and 138, 138 and 142. Such cam rollers all rotate in a counter clockwise direction, as seen in FIGURES 1, 2 and 4.

By the rotation of the cam roller shafts at a preselected speed, and moving the conveyor mesh 128 at a suitable speed, all vegetables, leaves or other produce elevated onto the shaker bed are given a plurality of gradually lifting impulses, followed by a sharp vertical impulse or acceleration, as the produce moves toward the discharge end of the shaker, and dirt, small detached leaves, sand, foreign matter, bugs, larvae and the like become detached from the produce and fall through the grid upon the table 194 below. Any suitable means for removing the debris may be provided.

Figure 4:
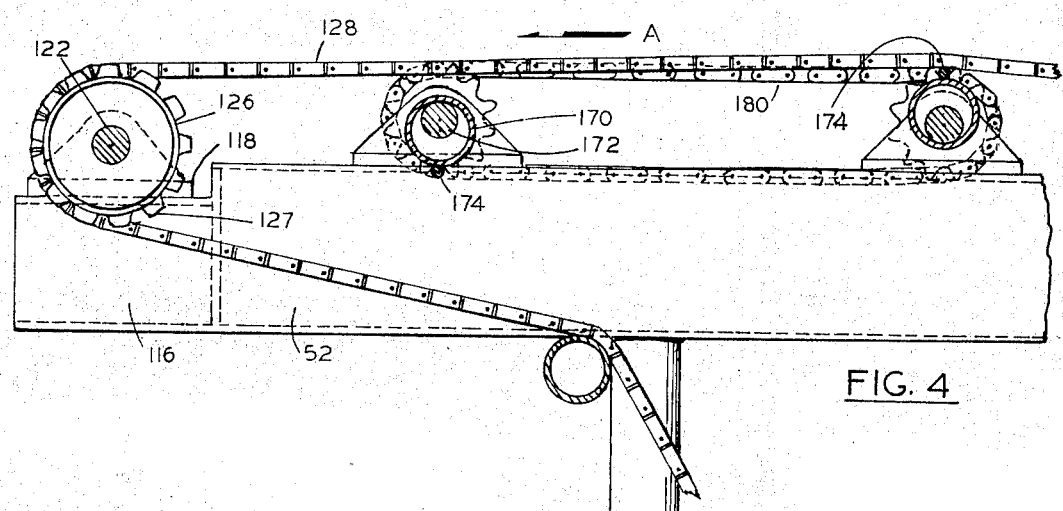
FIGURE 4 is a fragmentary sectional view taken on the line 4—4 of FIGURE 3.

The conveyor bed 128 moves in the direction or arrow A, see FIGURE 4, and the sprockets 126 on the shaft 122, rotated counter-clockwise. The return stretch 200 of the mesh is suspended below the platform 194, and is guide by transverse tubular members 202 and 204, over and under which the return stretch travels.

For the convenient control of the speeds of the elevator conveyor belt, and distributor 28, and the rate of travel of the conveyor mesh 128, and the shaker cam rollers 130, 132, 134, 136, 138, 140, 142 and 144, the hydraulic motors 80, 40, 176 and 160 may be connected in a series hydraulic circuit 210, supplied by a power driven oil pump 212, see FIGURES 1 and 9.

Thus all four hydraulic motors are driven simultaneously by the single pump. In order to vary the spreed of any one of the motors 80, 40, 176 or 160, valved bypasses 220, 222, 224 and 226, are provided, each having a manually controlled valve 30, 32, 34 and 36. By opening any valve to the extent desired, the flow of oil in the system, in the direction of arrow B, is bypassed in part around the respective motor, whereupon the motor speed is reduced. By regulating any of the valves, any speed of the motor associated therewith, from maximum to zero is obtainable. Zero speed of any motor is obtained by opening the bypass valve to permit all the oil to bypass such motor.

In practice, the velocity of the bed 128, and the speed of the motor 176 to actuate the shaker bed cam rollers may be set as desired, depending on the produce being subjected to the treatment. The produce is discharged from the end upon a conveyor 250 adapted to transport the produce for further processing on the market.

While a single modification of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A harvest produce shaker apparatus comprising a flexible bed comprising a flexible coarse mesh grid, a plurality of support rollers for said grid disposed beneath the grid, said rollers having eccentric axes substantially uniformly spaced and lying substantially in a common plane, a shaker cam rod mounted exteriorly on each of said rollers, along elements of said rollers of greatest eccentricity, and power means for rotating said cam rollers to effect shaking the flexible grid, said grid bed being a portion of an endless conveyor having drive means independent of said power means at one end to continuously draw and advance the grid bed across the support rollers, at a speed independent of the rotation speed of the cam rollers.

2. A shaker according to claim 1 wherein the eccentric rollers are of like diameter, and all driven at the same speed and in the same direction, and wherein the cam rods of alternate rollers are 180 degrees out of phase with the cam rods of the intermediate rollers.

3. A shaker according to claim 2 wherein each of the eccentric rollers is of a diameter in the order of two inches, and the radius of eccentricity is in the order of a quarter of an inch, and the cam rod is of a diameter in the order of a half inch.

4. A shaker in accordance with claim 1 wherein the rotation of the eccentric rollers is in the same direction as the travel of the conveyor grid bed.

5. A shaker in accordance with claim 1, wherein the mesh of the grid is in the order of an inch both lengthwise and crosswise thereof.

6. A shaker apparatus in accordance with claim 1 having a conveyor belt elevator for supplying harvest to one end of the shaker grid bed, and wherein means are associated with the elevator for controlling the thickness of the harvest transported by the elevator to the shaker apparatus.

7. A shaker and elevator apparatus in accordance with claim 6 wherein the thickness controlling means, the elevator conveyor, the power means for the eccentric rolls, and the mesh grid endless conveyor, are all driven by hydraulic motors in a series hydraulic circuit supplied by a single power driven pump, and in which each of the hydraulic motors is provided with a manually adjustable bypass to control the speed.

8. A shaker apparatus in accordance with claim 6, wherein the means for controlling the thickness of the harvest transported on the elevator, comprises a rotary drum disposed above the elevator and having a plurality of radial tines disposed in axial rows uniformly spaced angularly around the drum, and means to rotate the drum in a direction such that the tines sweep the elevator conveyor belt at a predetermined height thereabove, and in a direction opposite to the direction of travel of the conveyor belt.

9. A shaker in accordance with claim 1 having a platform disposed below the support rollers, and a guide member disposed adjacent and beneath the drive means end of the grid bed and over which an initial length of the return portion of the endless conveyor extends, and a second guide member disposed adjacent and beneath the other end of the grid bed, and under which the return portion of the conveyor extends, the portion of the conveyor between said guides being loosely hung and disposed beneath the platform.

10. A shaker in accordance with claim 1, wherein the endless grid bed comprises a plurality of like transverse edgewise mounted strip members having reverse bends spaced approximately an inch apart, and wherein the U portions formed by the reverse bends, of each strip member, are partially nested in the U bends of the adjacent strip and joined thereto by a pivot rod.

11. A shaker in accordance with claim 10, wherein the grid bed is driven by a shaft at one end having a plurality of spaced sprockets interengaging the U portion of the transverse strip members.

References Cited

UNITED STATES PATENTS

| | | | |
|---|---|---|---|
| 427,660 | 5/1890 | Beach | 209—308 X |
| 1,049,052 | 12/1912 | Clark | 209—347 |
| 1,459,854 | 6/1923 | Nelson | 209—308 X |
| 1,657,414 | 1/1928 | Silver | 209—308 |
| 2,009,624 | 7/1935 | Klugh | 209—347 |
| 2,311,814 | 3/1943 | Behnke et al. | 209—382 X |
| 2,624,447 | 1/1953 | Small | 198—161 |
| 3,067,855 | 12/1962 | Lambert | 198—161 X |
| 3,106,249 | 10/1963 | Zachery | 209—308 X |
| 3,241,670 | 3/1966 | Shell | 209—307 X |

FRANK W. LUTTER, *Primary Examiner.*

TIM R. MILES, *Examiner.*